Patented Feb. 28, 1933

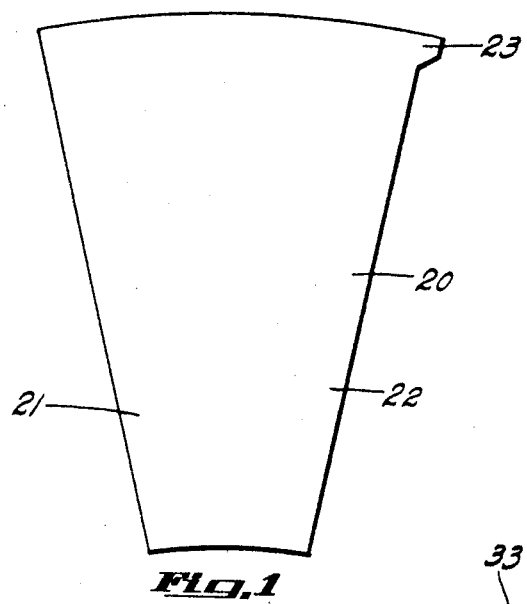
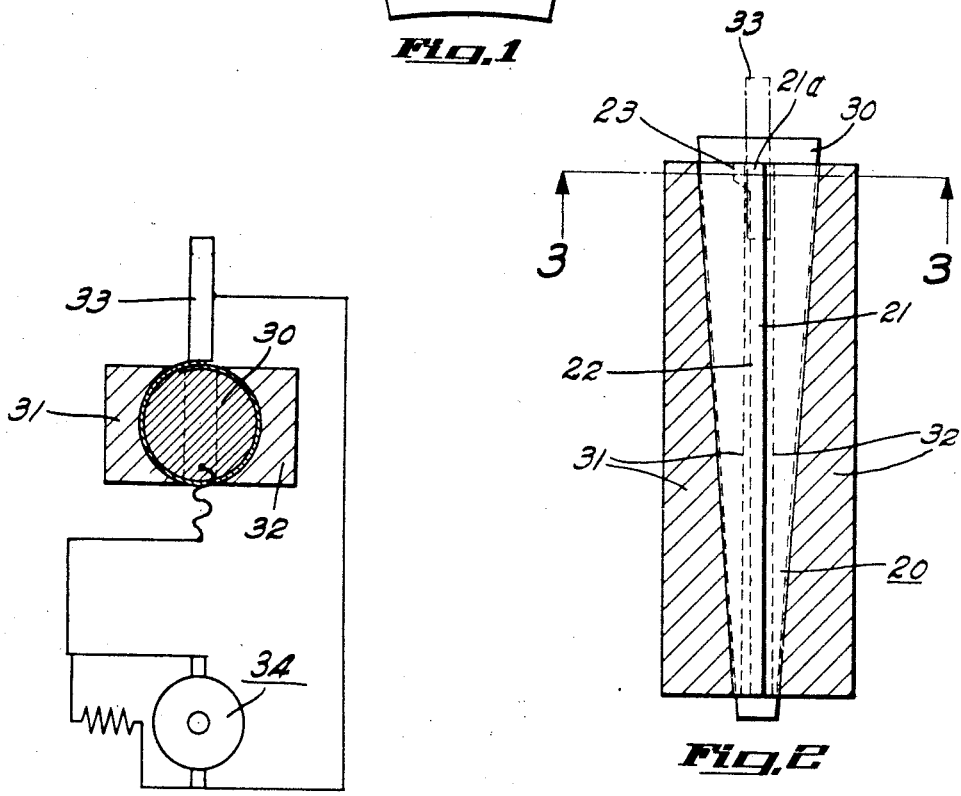

1,899,353

UNITED STATES PATENT OFFICE

ALVA W. PHELPS AND EDWARD A. KAEGI, OF ANDERSON, INDIANA, ASSIGNORS TO DELCO-REMY CORPORATION, OF ANDERSON, INDIANA, A CORPORATION OF DELAWARE

ELECTRIC WELDING

Application filed April 4, 1932. Serial No. 602,979.

This invention relates to the art of electrically welding relatively thin sheet metal parts, and one of the objects of the invention is to overcome undue heating or burning of the sheet metal at the starting of a lap-welded joint between the parts.

This object is accomplished in the disclosed form of the present invention by so shaping one of the overlapping parts that it will present at the starting end of the seam an additional contact surface, thereby decreasing the resistance per unit area of contact to a value such that the heating of the metal due to the initial surge of current when a movable electrode makes contact with the parts will not be sufficient to burn the metal and cause the same to volatilize and crumble away as an oxide.

In the disclosed embodiment of the invention one of the overlapping parts is provided with a small lug located at the starting point of the welding operation in order to provide an additional area of contact.

Further objects and advantages of the present invention will be apparent from the following description, reference being had to the accompanying drawing, wherein a preferred embodiment of one form of the present invention is clearly shown.

In the drawing:

Fig. 1 is a plan view of a sheet metal punching for forming a tapered, tubular member, one edge of the punching being provided with a lug in accordance with the practice herein set forth.

Fig. 2 is a plan view of the sheet metal part as shown in Fig. 1, folded around a conical mandrel and clamped thereto by clamping members which are shown in cross section.

Fig. 3 is a wiring diagram showing the welding electrodes in circuit with the current source and showing certain parts in section taken on the line 3—3 of Fig. 2.

The sheet metal blank 20 shown in Fig. 1 comprises overlapping portions 21 and 22, the latter including a lug 23. This blank 20 is bent into frusto-conical form and is placed on a frusto-conical mandrel 30 which forms one of the welding electrodes. It will be seen that the edge portion 21 laps over the edge portion 22 so that the lug 23 at the starting end of the welded seam is under the part 21a of the edge portion 21. The bent blank 20 is clamped against the mandrel 30 by metal clamps 31 and 32. The assembly of parts 20, 30, 31 and 32 is moved longitudinally of the part 30 under a roller electrode 33 which bears upon the edge portion 21 with yielding pressure applied by a spring (not shown). The mandrel 30 and the welding roller 33 are connected with a source of welding current such as a welding generator 34. When the roller 33 first engages the upper end of the seam is viewed in Fig. 2, there will be a sudden rush of current due to the sudden completion of the circuit of the generator through the mandrel 30, overlapping portions 21 and 22 of blank 20 and roller 33. This surge of current is but momentary; and immediately following it, the current drops to a normal value required for welding. The operation of pushing the work under the welding roller 33 causes a lap-weld to be formed between the overlapping portions 21 and 22.

Since the current source 34 must be adjusted so as to provide sufficient welding current for the entire welding operation, it is apparent that the initial surge of current at the starting of the welding operation will be excessive. If the area of the overlap between the portions 21 and 22 were uniform, this surge of current would be sufficient to melt and oxidize the sheet metal at the region where the roller 33 first engages the blank 20. By providing the lug 23, an additional area of contact is provided, thereby reducing the resistance per unit area to such value that the excessive heat is not localized, but is distributed over an area which is substantially greater than the area of overlap between the major portions of the parts 21 and 22. By placing the lug 23 on the inside of the edge portion 21, the lug 23 is not visible from the exterior and the joint from the exterior appears as any conventional lap-welded joint.

While the form of embodiment of the present invention as herein disclosed constitutes a preferred form, it is to be understood that other forms might be adopted, all coming within the scope of the claims which follow.

What is claimed is as follows.

1. The method of forming a lap-weld joint in a sheet metal article which includes shaping the article so that at least one of the lapping portions of sheet metal is substantially wider at one end of the seam to be welded than along the major portion of the seam, and in applying welding current to the seam first at the said end of the seam having the lapping portion of extra width.

2. The method of forming a lap-weld joint in a sheet metal article which includes shaping the article so that the under-lapping portion of sheet metal is substantially wider at one end of the seam to be welded than along the major portion of the seam, and in applying a welding electrode to the seam starting at the said end of the seam having the under-lapping portion of extra width.

3. The method of forming a tubular sheet metal body which includes making a sheet metal blank of a shape such that, when the blank is bent into tubular form, one edge portion will overlap the other and one lapping portion will be provided, at one end of the seam to be welded, with a part of substantially greater width than at the major part of the seam, in applying a clamping electrode to the sheet metal tube, and in applying a roller electrode to the seam to be welded starting at the end of the seam which includes the lapping part of extra width.

4. The method of forming a tubular sheet metal body which includes making a sheet metal blank of a shape such that, when the blank is bent into tubular form, one edge portion will overlap the other and one lapping portion will be provided at one end of the seam to be welded with a part of substantially greater width than at the major part of the seam; in bending the blank into tubular form; in clamping the sheet metal tube against an electrode of such form that the lapping portions are forced into proper overlapping position; and in applying a roller electrode to the seam to be welded starting at the end of the seam which includes the lapping part of extra width.

5. The method of forming a tubular sheet metal body which includes making a sheet metal blank of a shape such that, when the blank is bent into tubular form, one edge portion will overlap the other and one lapping portion will be provided at one end of the seam to be welded with a part of substantially greater width than at the major part of the seam; in bending the blank into tubular form; in clamping the sheet metal tube around an electrode of such form that the lapping portions are forced into proper overlapping position; and in applying a roller electrode to the seam to be welded starting at the end of the seam which includes the lapping part of extra width.

In testimony whereof we hereto affix our signatures.

ALVA W. PHELPS.
EDWARD A. KAEGI.